(12) United States Patent
Mullarkey

(10) Patent No.: US 7,743,128 B2
(45) Date of Patent: Jun. 22, 2010

(54) METHOD AND SYSTEM FOR VISUALIZING NETWORK PERFORMANCE CHARACTERISTICS

(75) Inventor: Peter Mullarkey, Austin, TX (US)

(73) Assignee: Netqos, Inc., Austin, TX (US)

( * ) Notice: Subject to any disclaimer, the term of this patent is extended or adjusted under 35 U.S.C. 154(b) by 1279 days.

(21) Appl. No.: 11/110,973

(22) Filed: Apr. 20, 2005

(65) Prior Publication Data

US 2006/0242282 A1    Oct. 26, 2006

(51) Int. Cl.
| | |
|---|---|
| G06F 15/173 | (2006.01) |
| G06F 11/30 | (2006.01) |
| G06F 3/00 | (2006.01) |
| G06F 15/177 | (2006.01) |
| G21C 17/00 | (2006.01) |

(52) U.S. Cl. ............... 709/223; 709/224; 709/238; 702/182; 715/733; 715/734; 715/735; 715/736; 715/737

(58) Field of Classification Search .......... 709/223, 709/224, 238; 702/182; 715/733, 734, 735, 715/736, 737, 738

See application file for complete search history.

(56) References Cited

U.S. PATENT DOCUMENTS

| | | | | |
|---|---|---|---|---|
| 5,819,028 A | * | 10/1998 | Manghirmalani et al. | ..... 714/57 |
| 5,919,248 A | * | 7/1999 | Kahkoska et al. | ........... 709/224 |
| 6,271,845 B1 | * | 8/2001 | Richardson | ................. 715/764 |
| 6,487,604 B1 | * | 11/2002 | Rochford et al. | ............ 709/238 |
| 6,970,924 B1 | * | 11/2005 | Chu et al. | .................... 709/224 |
| 6,975,963 B2 | * | 12/2005 | Hamilton et al. | ............ 702/182 |
| 2004/0064293 A1 | * | 4/2004 | Hamilton et al. | ............ 702/182 |

* cited by examiner

Primary Examiner—Kevin Bates
Assistant Examiner—Mohammed Ahmed
(74) Attorney, Agent, or Firm—Baker Botts L.L.P.

(57) ABSTRACT

Techniques for visualizing and monitoring the quality of service for a computer network. Herein, a method and system monitor network transactions and behaviors for the computing network, which computing network includes one or more client subnets accessing one or more servers, The monitoring may be independent of client site monitors. Statistical data is gathered for relating to at least the network, the server, and the applications for generating a plurality of measurements. The measurements assess at least one quality of service indicator associated with the performance of the computer network. The method and system graphically display the plurality of measurements of the quality of service indicator according to the date and time of gathering the statistical data and further display graphically the degree by which each of the measurements of the quality of service indicator varies from a predetermined threshold quality of service level for the computing network. Also, dynamic quality of service indicators are monitored against average quality of service indicators.

16 Claims, 12 Drawing Sheets

METHOD AND SYSTEM FOR VISUALIZING NETWORK PERFORMANCE CHARACTERISTICS

FIELD

The disclosed subject matter relates to computer and related electronic systems networks. More particularly, this disclosure relates to a novel and improved method and system for visualizing network performance characteristics.

DESCRIPTION OF THE RELATED ART

Most network engineers are very familiar with tools that report statistics on individual components such as links, routers, and servers. These infrastructure monitors have been around for a long time. Newer to the market are performance monitoring appliances that report end-to-end statistics and the end-user experience. These appliances provide a comprehensive view of the enterprise, without the need for desktop or server agents. They measure how well response time Service Level Agreements (SLAs) are being met. They also help solve a wide variety of problems with solutions that lead to significant reductions in operating costs.

End-to-end performance monitoring can be extremely useful as a proactive method for both rapid troubleshooting and performance management of enterprise networks and server aggregations. Such monitoring has been successfully implemented to quickly identify and resolve the myriad of performance issues associated with networks, servers, and applications. The use of end-to-end performance monitoring appliances has uncovered serious inefficiencies with load balancers, poorly designed applications, by passed proxy servers, ineffective cache servers, aggressive active agents, and badly designed "redundant" networks. They can provide the "big-picture" view of networks and applications to answer questions that are critical for the end-user experience. These questions may include knowing what impact server consolidation will have on users. Such applications can help address which will work better on a particular network, a thick or thin clients configuration. Also performance monitoring applications can help identify which of sites are in greatest need of upgrades or downgrades, and which web pages are the slowest to download Drill-down troubleshooting capabilities can reveal metrics that can save weeks or months of time in identifying and resolving issues. Analyses that previously required six weeks to complete with packet sniffing tools may be accomplished in minutes when end-to-end performance monitoring appliances are properly configured. Because they continuously monitor applications, such appliances notice and report even difficult intermittent issues that cannot readily be reproduced. If a problem occurred at 3:00 a.m. the previous morning, their stored reports can be used for a post-mortem analysis. There is no need to wait for a recurrence in order to capture the behavior the way legacy troubleshooting tools require.

End-to-end performance monitoring appliances with intelligent thresholds can alert a network performance management team to a developing problem before the problem severely impacts customers. Such proactive management and high-level views allow network managers to discover new ways to optimize the network.

Unfortunately, known end-to-end performance monitoring and management systems fail to provide completely satisfactory operation. There are several existing response-time monitoring tools (e.g., NetIQ's Pegasus and Compuware's Ecoscope) that require a hardware and/or software agent be installed near each client site from which end-to-end or total response times are to be computed. The main problem with this approach is that it can be difficult or impossible to get the agents installed and keep them operating. For a global network, the number of agents can be significant; installation can be slow and maintenance painful. For an eCommerce site, installation of the agents is not practical; requesting potential customers to install software on their computers probably would not meet with much success. A secondary issue with this approach is that each of the client-site agents must upload their measurements to a centralized management platform; this adds unnecessary traffic on what may be expensive wide-area links. A third issue with this approach is that it is difficult to accurately separate the network from server delay contributions.

To overcome the issue with numerous agent installs, some companies (e.g., KeyNotes and Mercury Interactive) offer a subscription service whereby one may use their preinstalled agents for response-time monitoring. There are two main problems with this approach. One is that the agents are not monitoring "real" client traffic but are artificially generating a handful of "defined" transactions. The other is that the monitoring does not generally cover the full range of client sites—the monitoring is limited to where the service provider has installed agents.

Developers continue to improve methods and systems for testing networks, servers, and services for availability and performance. Among what is needed is the ability to visualize the operations of a computer network for identifying performance management issues and problems, together with probable causes of related problems.

SUMMARY

Techniques for visualizing network performance characteristics are disclosed, which techniques improve both the operation of the associated networks and support more associated performance management functions.

According to one aspect of the disclosed subject matter, there is here provided a method and system for visualizing and monitoring quality of service of a computing network. The method includes the steps and the system includes the structures for monitoring application network transactions and behaviors for the computing network. The computing network includes one or more client subnets accessing one or more servers. The monitoring may be independent of client site monitors. The method and system gather statistical data relating to at least one network, a server and associated applications and generate a plurality of measurements of at least one quality of service indicator. The quality of service indictors relate to the performance of the computer network. The method and system further display the plurality of measurements of the at least one quality of service indicator according to the date and time of gathering the statistical data and displaying graphically the degree by which each of said plurality of measurements of the quality of service indicator varies from a predetermined threshold quality of service level for the computing network.

According to another aspect of the disclosed subject matter, here is disclosed a method and system for visualizing and monitoring the performance of a computer network that include the steps and structures for displaying graphically a plurality of averaged network quality of service indicators. The averaged network quality of service indicators are associated on a radial plot and visually interlinked to form a nominal performance polygon. The nominal performance polygon includes a plurality of corners. Each of said corners corresponds to a separate one of the plurality averaged quality of service indicators. The method and system furthermore dynamically measure a plurality of network quality of service indicators. Each of the plurality of network quality of service indicators corresponds to one of the plurality of averaged network quality of service indicators. The method and system display graphically the dynamically measured plurality of network quality of service indicators as a radial plot point on the radial plot and visually interlink the radial plot points for forming a dynamic performance polygon. The dynamic performance polygon relates to the dynamic performance of the computer network. The disclosed subject matter allows monitoring the dynamic performance of the computer network by dynamically comparing variations in said dynamic performance polygon with said nominal performance polygon.

A technical advantage of the disclosed subject matter includes the ability to directly compare metrics or measurements of different network quality of service indicators, regardless of the particular units of measure that may associate with the different indicators. Because the method and system here disclosed compare normalized indicator measurements to averaged values of network quality of service indicator, the indicators may be in milliseconds, percents, counts, or other measurement units.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages that are included within this description, be within the scope of the accompanying claims.

BRIEF DESCRIPTIONS OF THE DRAWINGS

The features, nature, and advantages of the disclosed subject matter will become more apparent from the detailed description set forth below when taken in conjunction with the drawings in which like reference characters identify correspondingly throughout and wherein.

Figure 3:
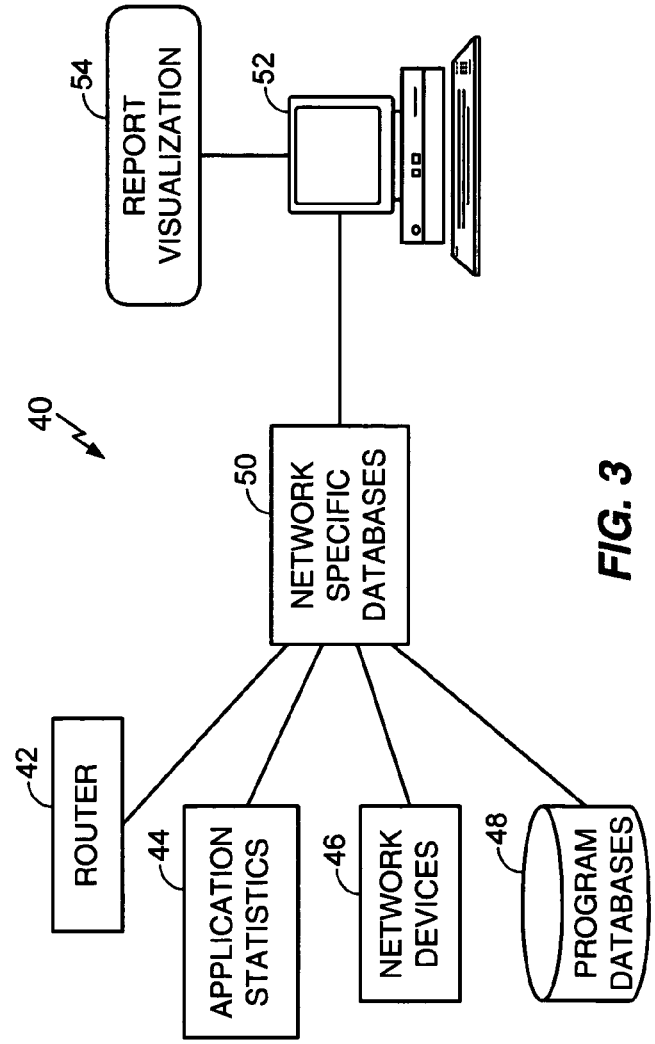
Figure 4:
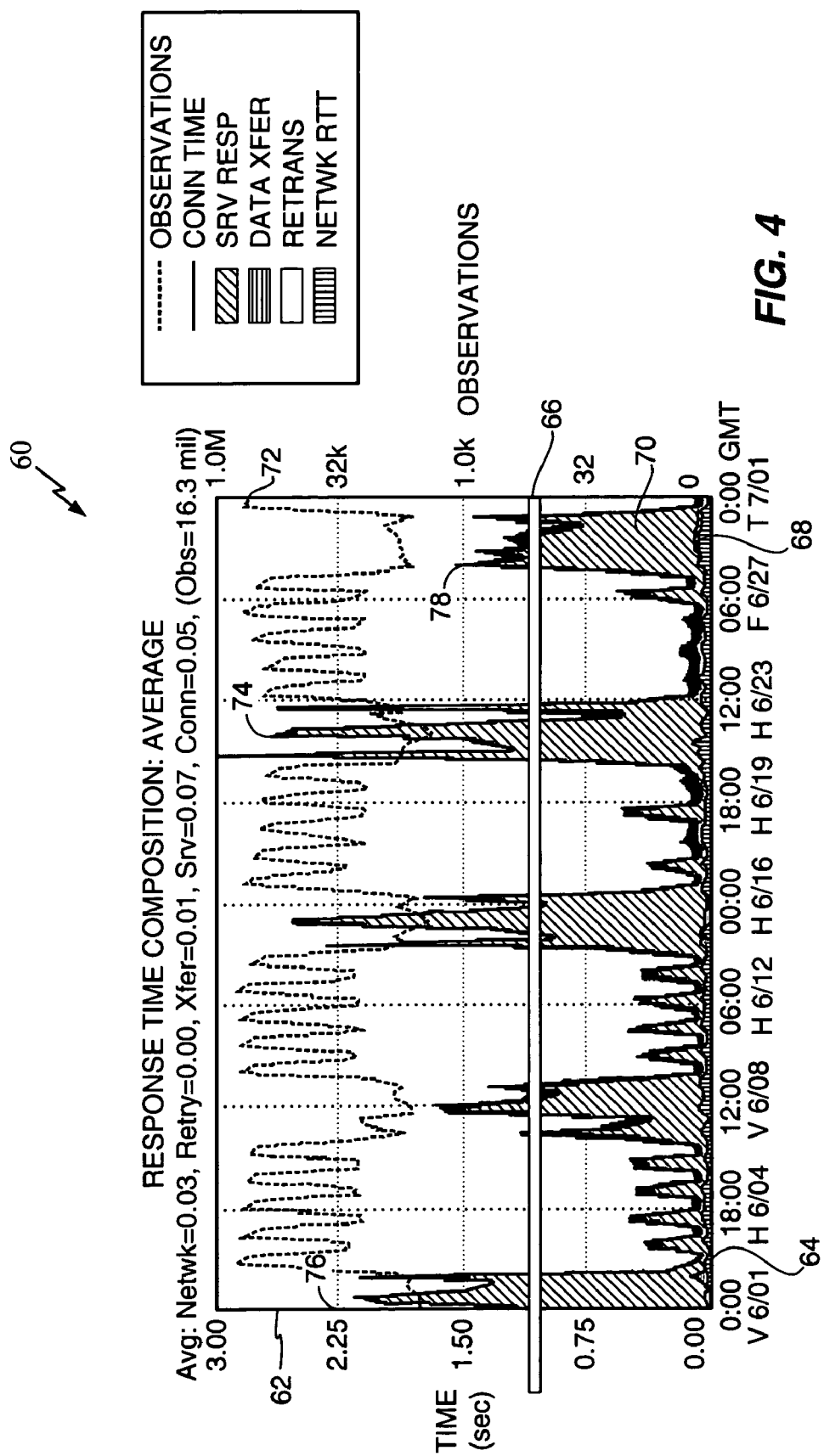
Figure 5:
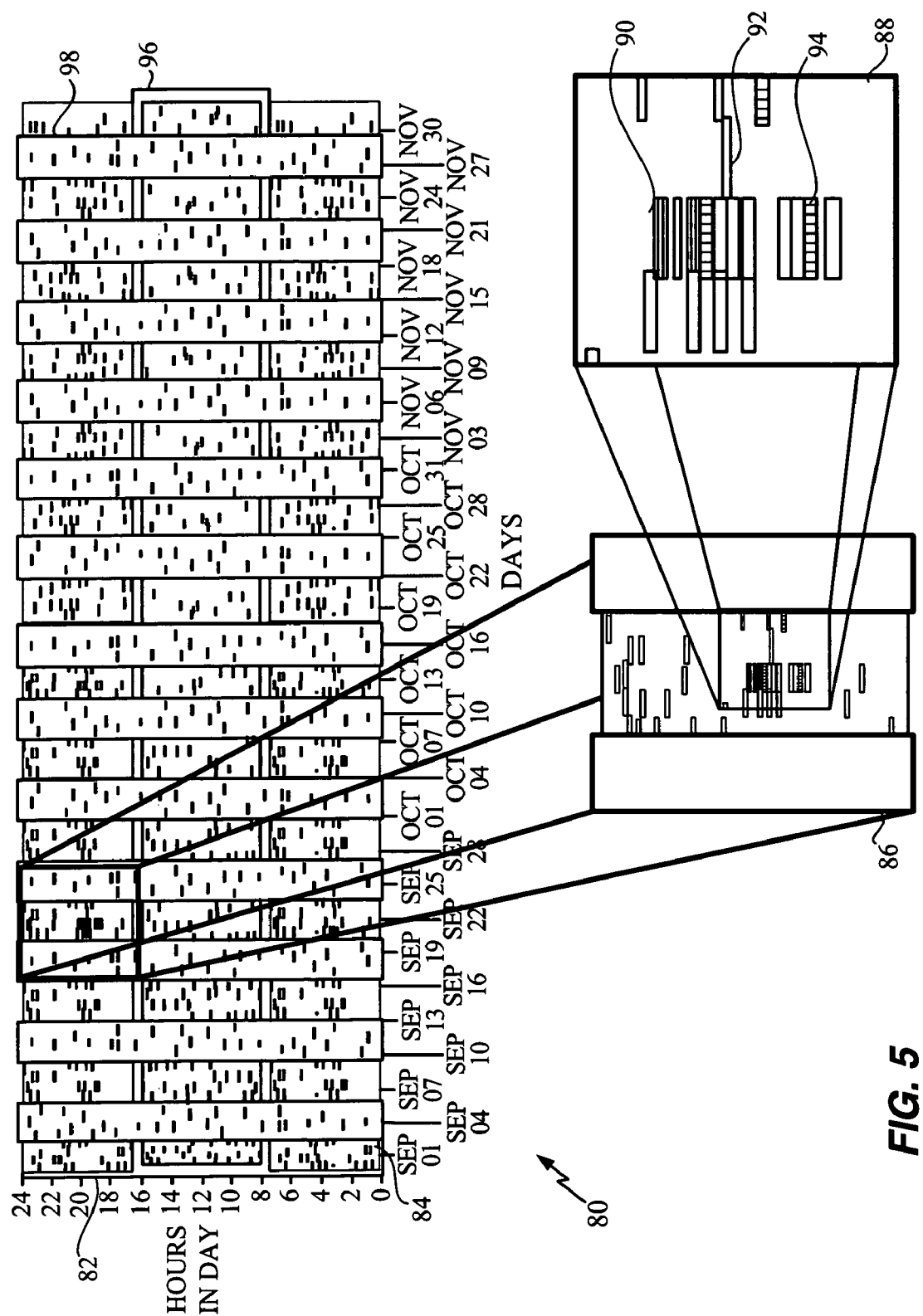
Figure 6:
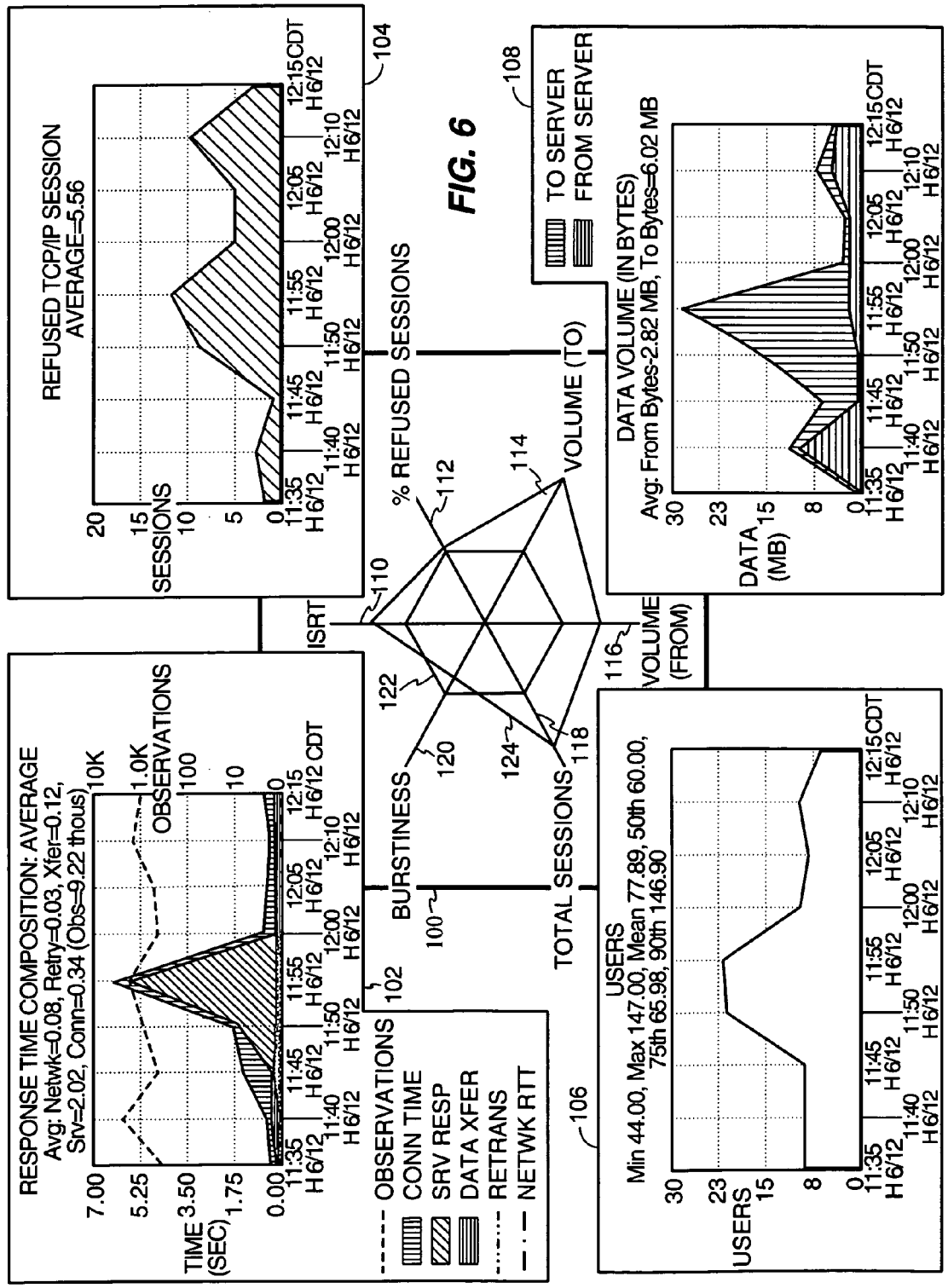
Figure 7:
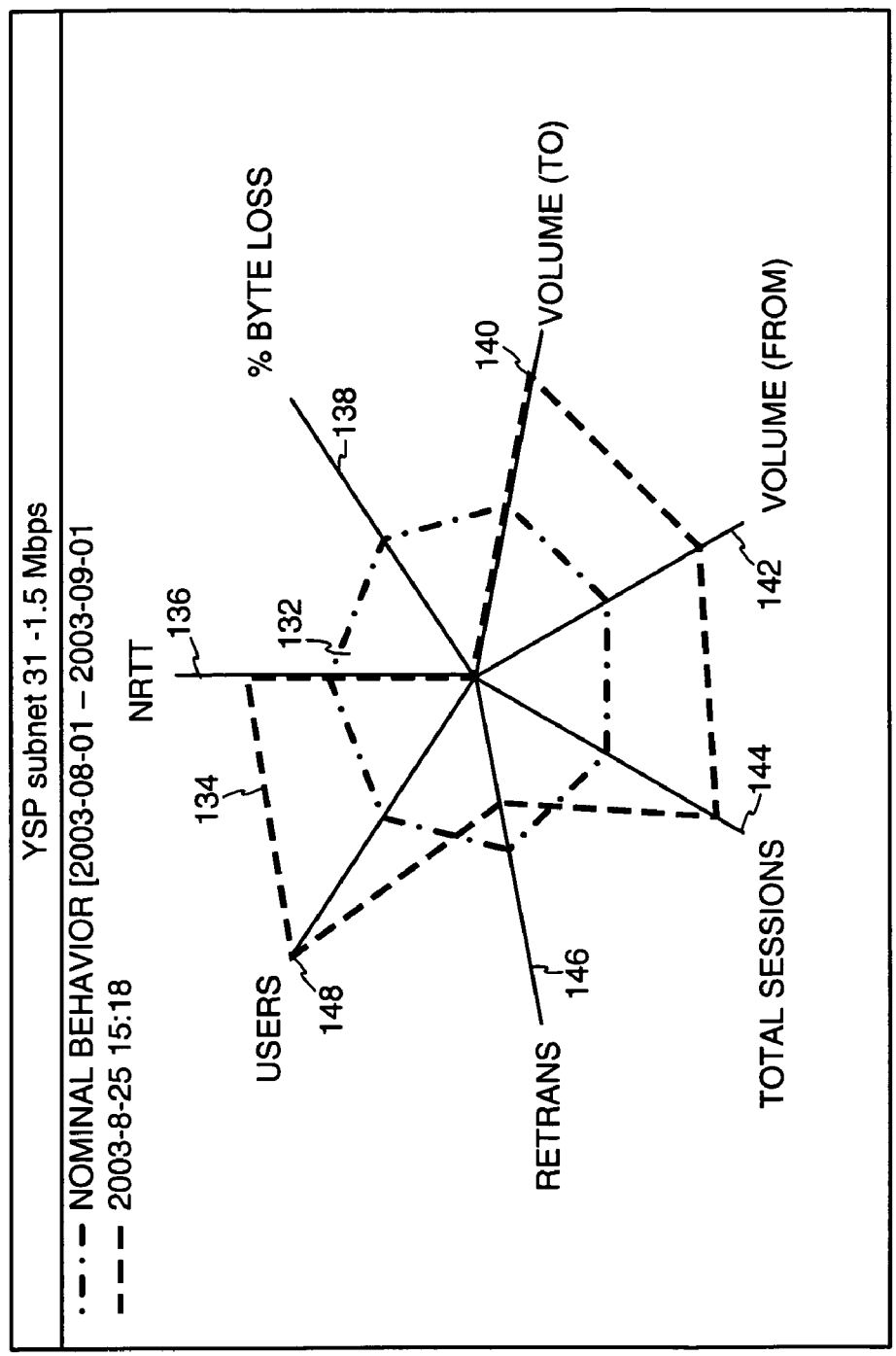
Figure 8:
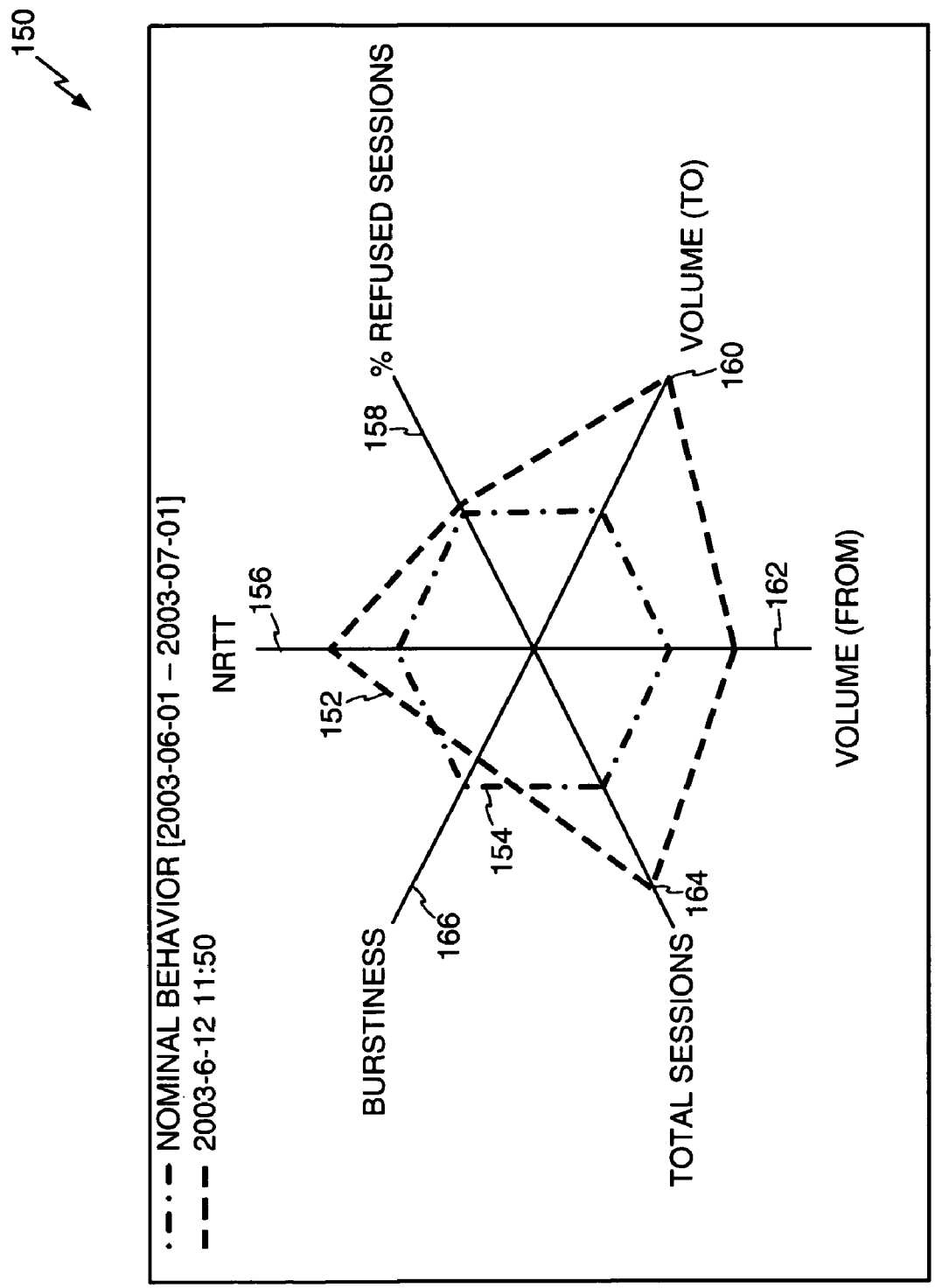
Figure 9:
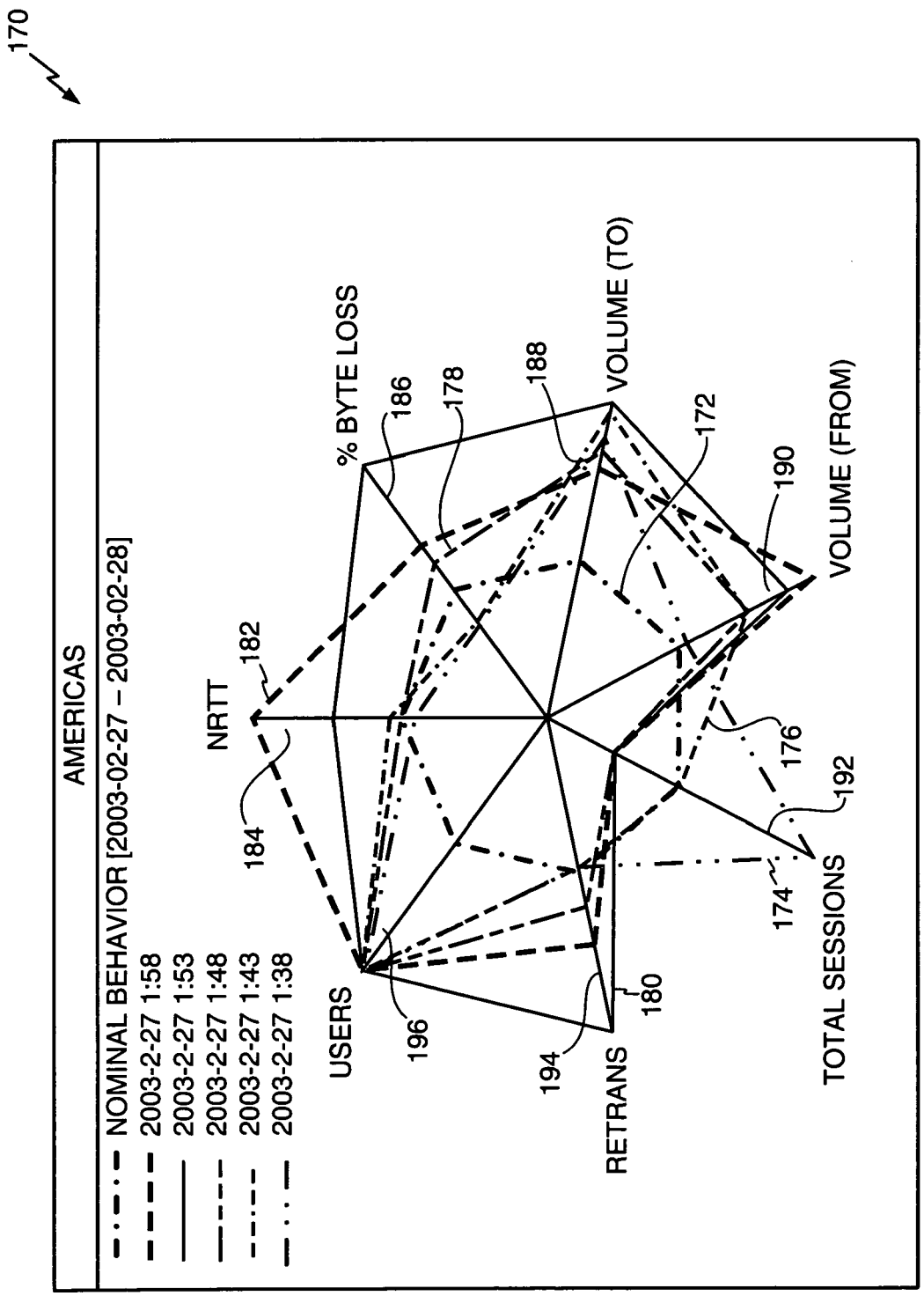
Figure 10:
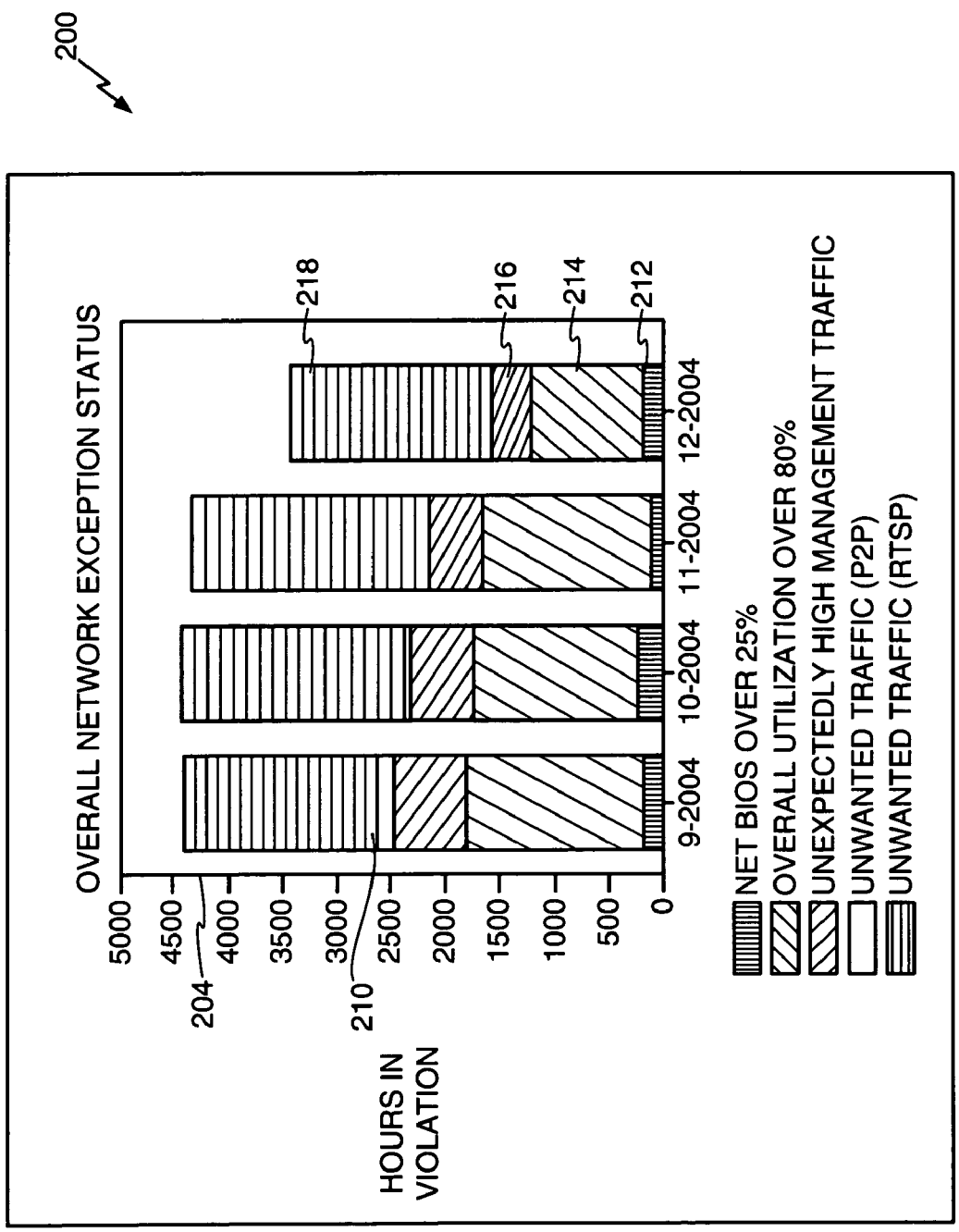
Figure 11:
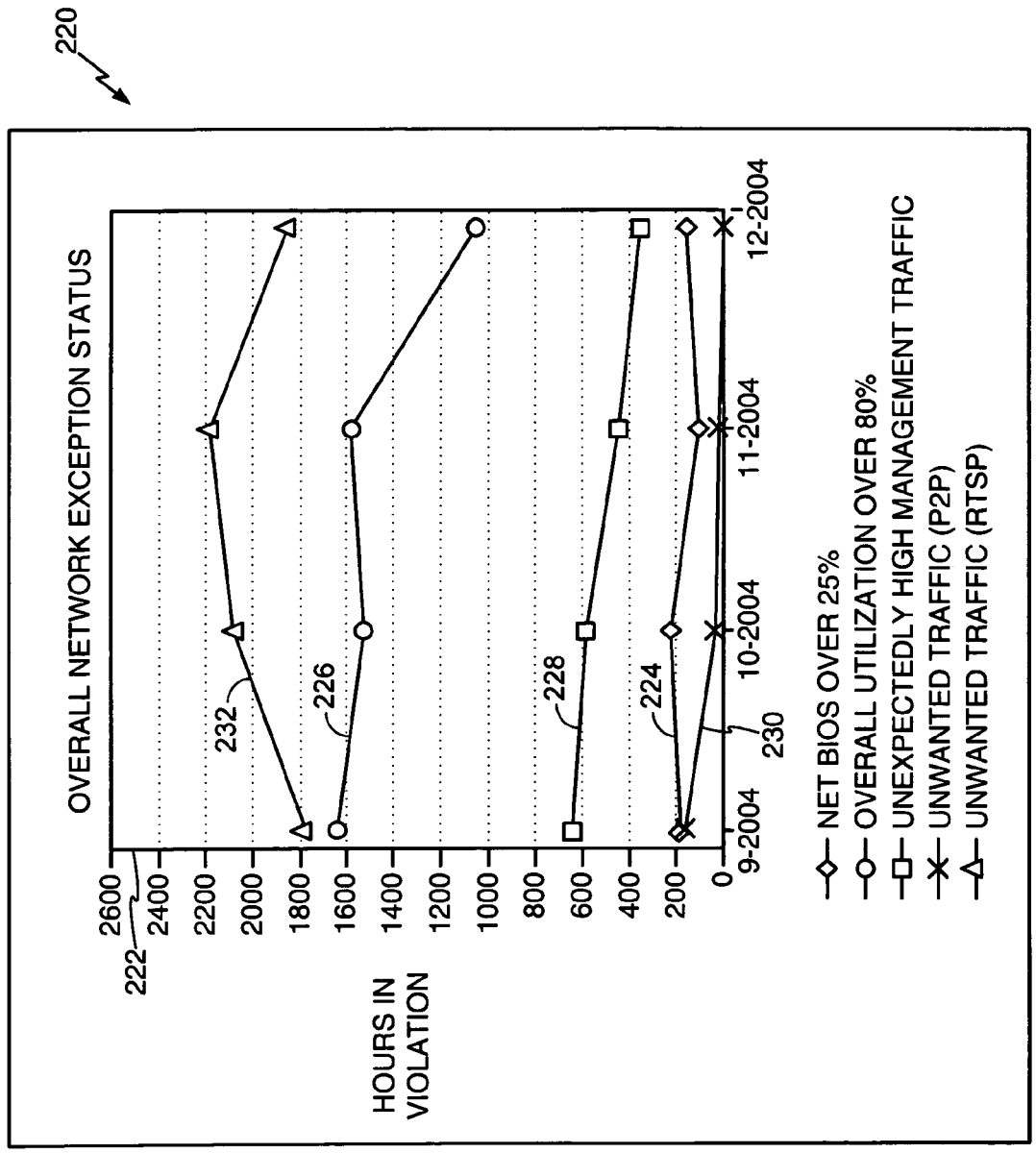
Figure 12:
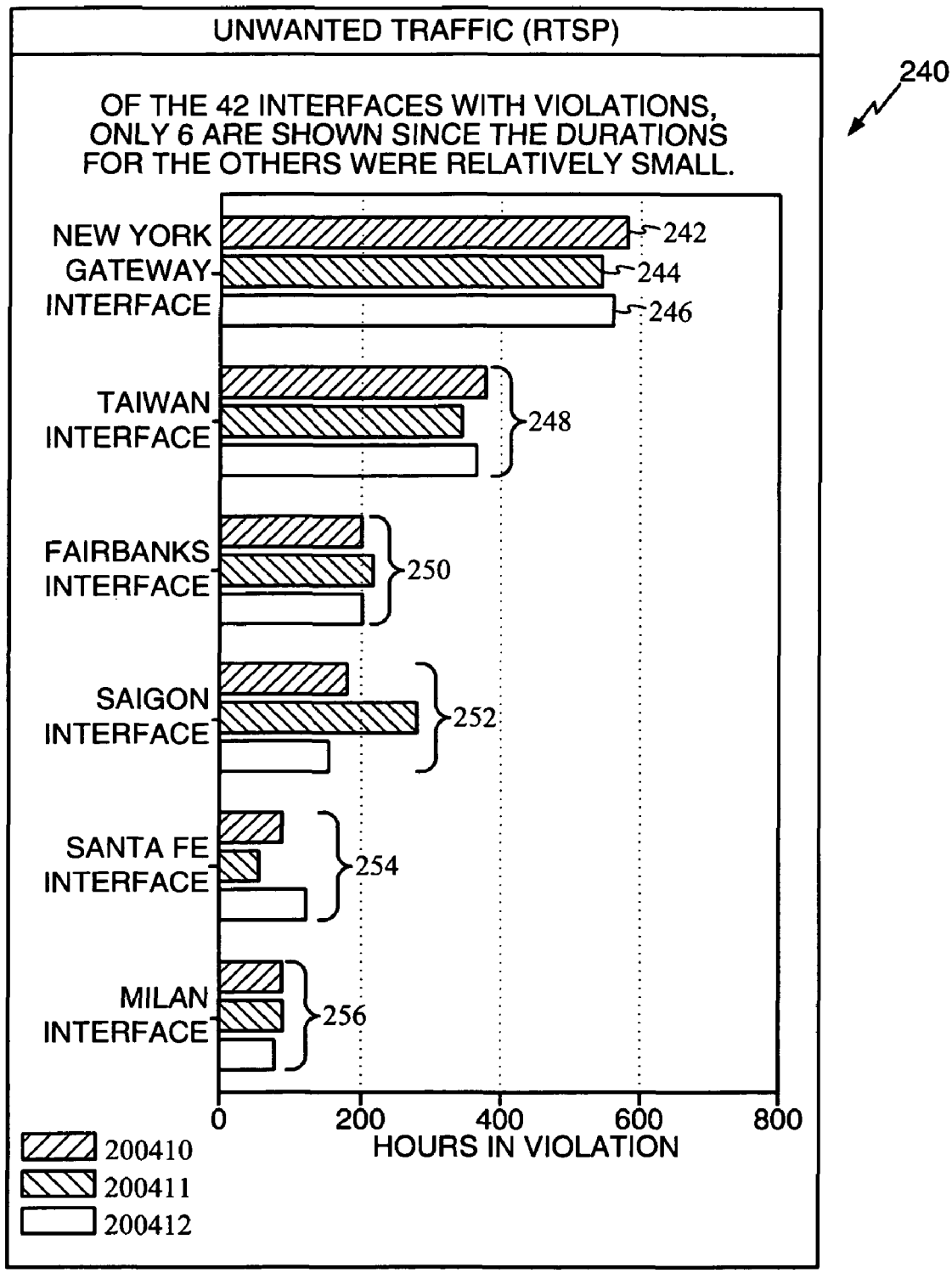

FIG. 3 provides a block diagram of the network optimization system for one embodiment of the disclosed subject matter;

FIG. 4 shows an application response time versus date plot of one embodiment of the disclosed subject matter;

FIG. 5 provides a violation intensity chart generated by the disclosed subject matter;

FIG. 6 provides an overview diagram for associating performance statistics with server print plots of the present embodiment;

FIGS. 7 and 8 show dynamic performance polygons and nominal performance polygons deriving from operation of the disclosed subject matter;

FIG. 9 depicts time varying dynamic performance polygons for reporting variations in computer network performance;

FIGS. 10 and 11 present overall network exception status visualizations as provided by the disclosed subject matter;

FIG. 12 visually illustrates chronological variations in unwanted traffic for site-specific trend analysis using the disclosed subject matter.

DETAILED DESCRIPTION OF THE SPECIFIC EMBODIMENTS

Figure 1:
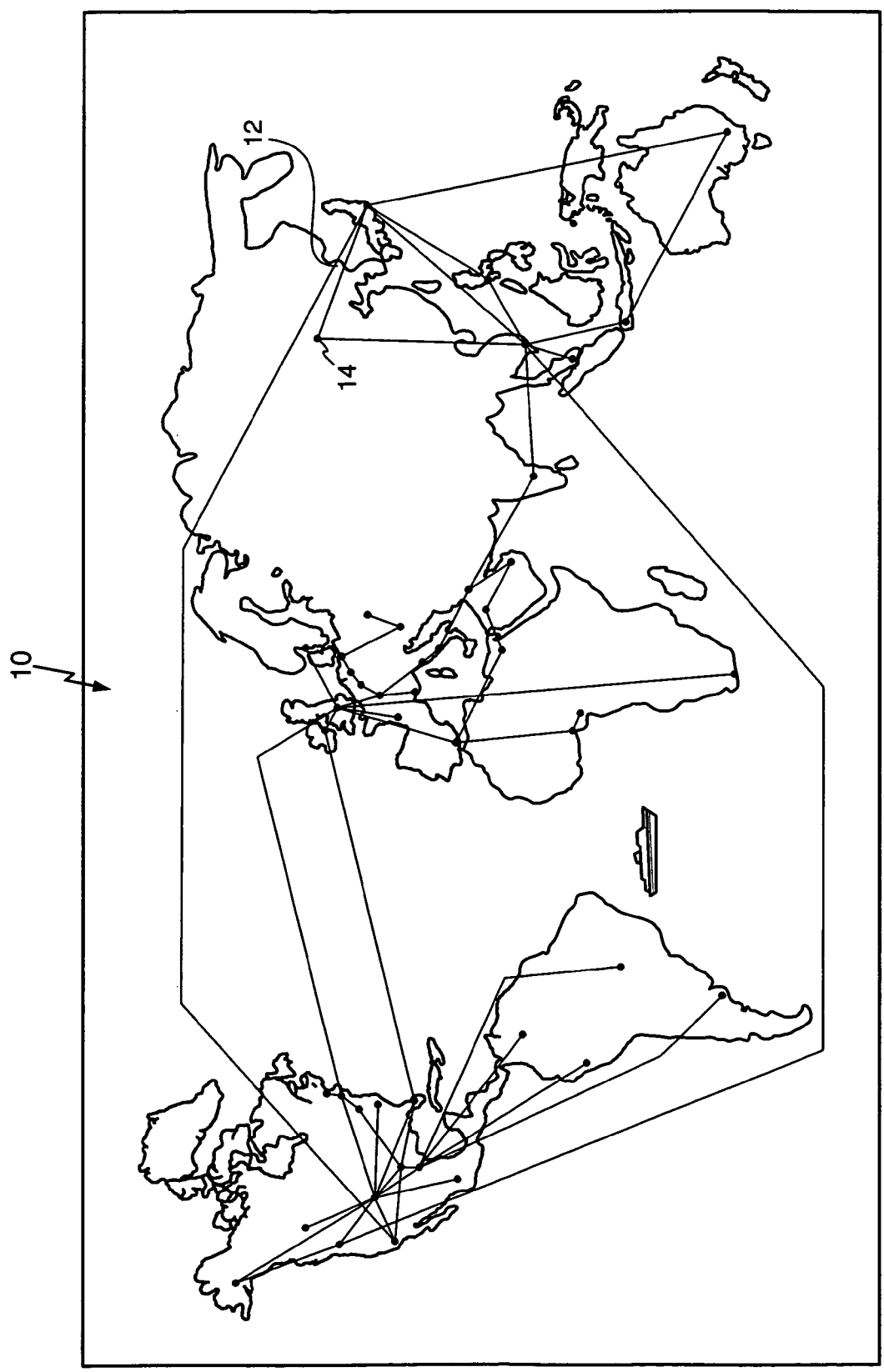
FIG. 1 shows geographically a computer network that spans the globe and to which the teachings of the disclosed subject matter may apply.

FIG. 1 shows geographically a computer network that spans the globe and to which the teachings of the disclosed subject matter may apply. Across the globe 10, a computer network 12, which may actually include an association of many networks, communicates connects different sites 14 to one another. In such a computer network, addressing performance changes arising from new application deployments, determining how best to satisfy near future network and user needs, and performing proactive and reactive trouble shooting all require network managers and technicians a variety of performance management functions. These performance management functions must resolve how network managers respond to problems as they arise.

Figure 2:
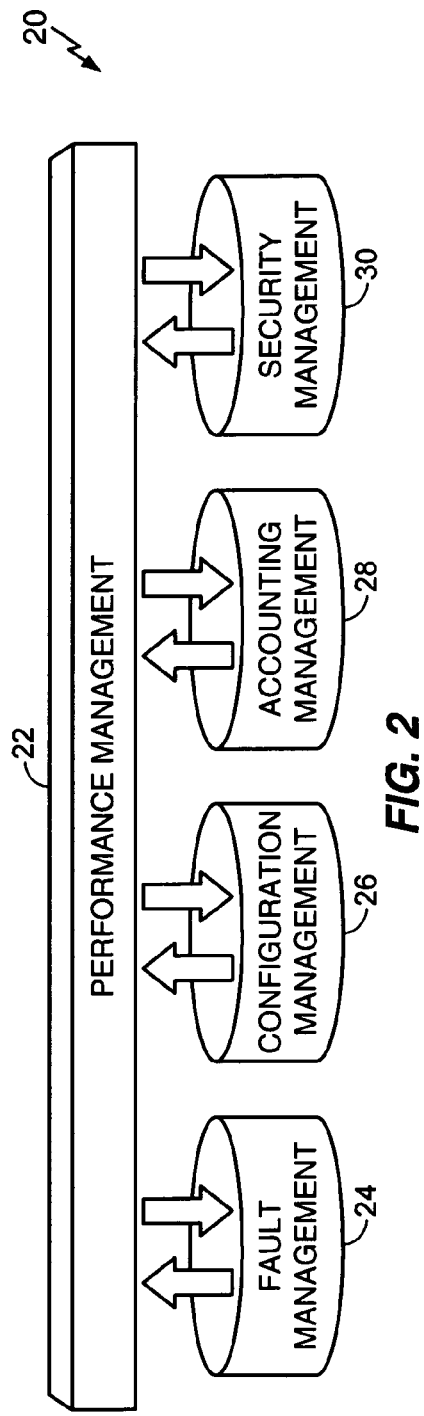
FIG. 2 depicts conceptually the network performance environment of the disclosed subject matter.

FIG. 2 shows, therefore, shows computer network performance environment 20. Computer network performance environment 20 includes performance management functions 22, which communicate and interoperate with fault management functions 24, configuration management functions 26, accounting management functions 28, and security management functions 30. Performance management functions 22 ensure the efficient utilization of computer network 12 resources. This includes minimizing the impact of resource contention to make processes continuously and efficiently operate. Using fault management functions 24, configuration management functions 26, accounting management functions 28, and security management functions 30, performance management functions 22 ensure that each application/user receives what is required over all time-scales by optimally using available resources, such as device CPU resources, memory resources, and bandwidth resources.

Performance management functions 22 to which the disclosed subject matter relates provide (a) proactive, measurement-based management functions for permitting, root cause/routing bottleneck diagnosis using fault management functions 24; (b) capacity planning and design, server location decisions, technology evaluations, and requirement predictions using configuration management functions 26; (c) cost/performance trade-off analyses using accounting management functions 28, and privacy and intrusion detection and prevention policies and procedures using security management functions 30. In addressing these characteristics of performance management environment 20, the disclosed subject provides a method and system for visualizing network performance characteristics.

FIG. 3 relates more directly the visualization method and system of the disclosed subject matter to network optimization system 40, which provides many computer network 12 performance management functions. Network optimization system 40 permits troubleshooting enterprise application problems and optimizing computer network 12 performance. Network optimization system 40, therefore includes performance management functions 22 for ensuring consistent delivery of business critical applications, documenting information technology service levels and improving the end user's experience. One embodiment of network optimization system 40 associates router 42, application statistics function 44, network devices 46, and program databases 48 to communicate with program databases 50. Network specific databases 50 communicate with analysis functions on workstation 52. Using the analysis functions of network optimization system 40, workstation 52 provides report visualization functions 54, as described herein. Network optimization system 40 may be such as described in commonly assigned U.S. patent application Ser. No. 10/962,331 entitled "Dynamic Incident Tracking and Investigation in Service Monitors," by Cathy Anne Fulton et al.

Although described with particular reference to a computing environment that includes personal computers (PCs), a wide area network (WAN) and the Internet, the claimed network optimization system 40 subject matter can be implemented in any information technology (IT) system in which it is necessary or desirable to monitor performance of a network and individual system, computers and devices on the network. Those with skill in the computing arts will recognize that the disclosed embodiments have relevance to a wide variety of computing environments in addition to those specific examples described below. In addition, the methods of the disclosed invention can be implemented in software, hardware, or a combination of software and hardware. The hardware portion can be implemented using specialized logic; the software portion can be stored in a memory and executed by a suitable instruction execution system such as a microprocessor, PC or mainframe.

All references, including publications, patent applications, and patents, cited herein are hereby incorporated by reference to the same extent as if each reference were individually and specifically indicated to be incorporated by reference and were set forth in its entirety herein.

In the context of this document, a "memory," "recording medium" and "data store" can be any means that contains, stores, communicates, propagates, or transports the program and/or data for use by or in conjunction with an instruction execution system, apparatus or device. Memory, recording medium and data store can be, but are not limited to, an electronic, magnetic, optical, electromagnetic, infrared or semiconductor system, apparatus or device. Memory, recording medium and data store also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

Figure 3A:
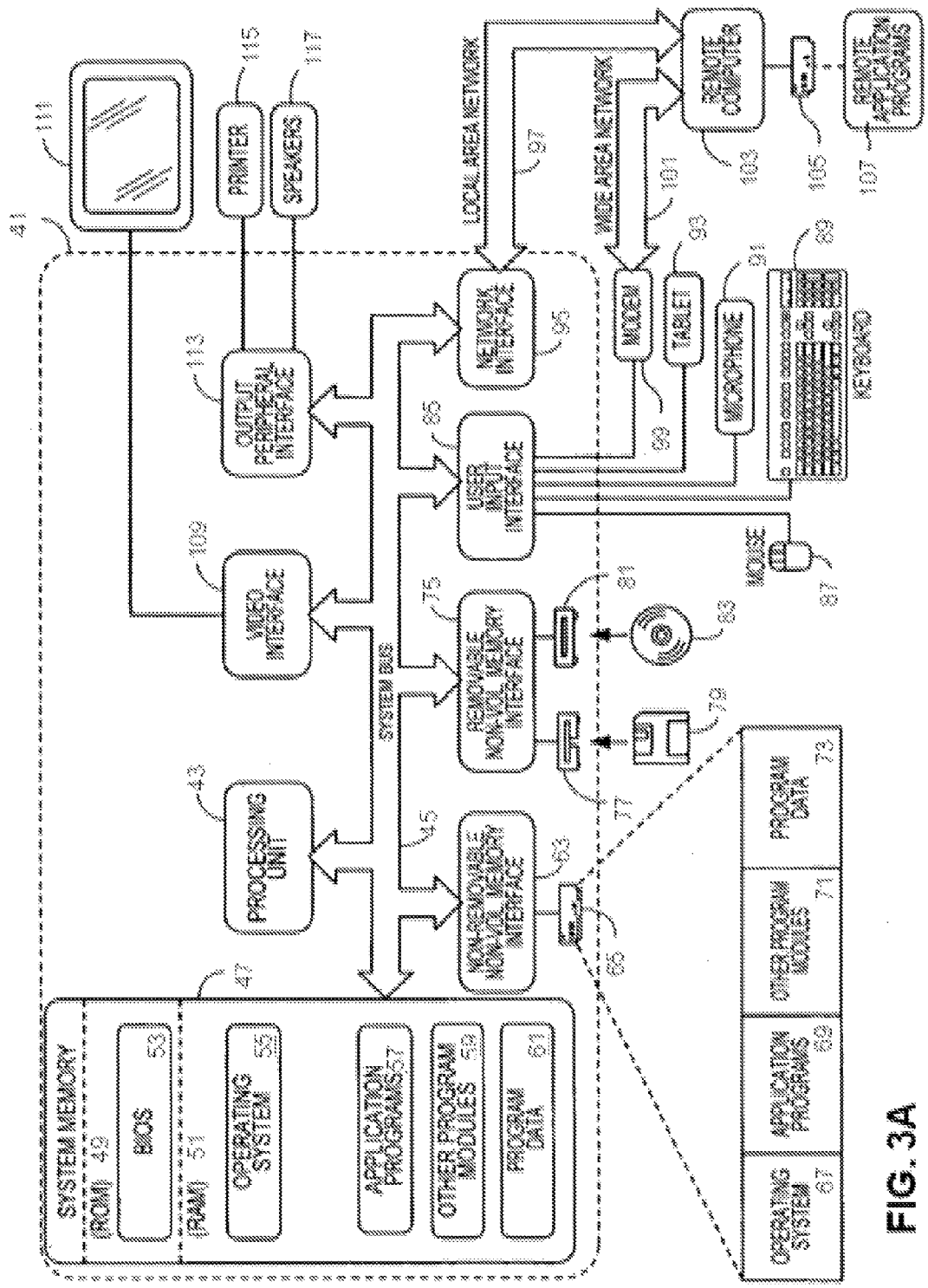

FIG. 3A is a block drawing of an exemplary computing environment 40 that supports the claimed subject matter. FIG. 3A illustrates an example of a suitable computing system environment 40 on which the invention may be implemented. The computing system environment 40 is only one example of a suitable computing environment and is not intended to suggest any limitation as to the scope of use or functionality of the invention. Neither should the computing environment 40 be interpreted as having any dependency or requirement relating to any one or combination of components illustrated in the exemplary operating environment 40.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments wherein tasks are performed by remote processing devices that are linked through a communications network. In a distributed computing environment, program modules may be located in local and/or remote computer storage media including memory storage devices.

With reference to FIG. 3A, an exemplary system within a computing environment for implementing the invention includes a general purpose computing device in the form of a computer 41. Components of the computer 41 may include, but are not limited to, a processing unit 43, a system memory 47, and a system bus 45 that couples various system components including the system memory to the processing unit 43. The system bus 45 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 41 typically includes a variety of computer readable media. Computer readable media can be any available media that can be accessed by the computer 10 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 41. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 47 includes computer storage media in the form of volatile and/or nonvolatile memory such as read only memory (ROM) 49 and random access memory (RAM) 51. A basic input/output system 53 (BIOS), containing the basic routines that help to transfer information between elements within computer 41, such as during start-up, is typically stored in ROM 49. RAM 51 typically contains data and/or program modules that are immediately accessible to and/or presently being operated on by processing unit 43. By way of example, and not limitation, FIG. 3A illustrates operating system 55, application programs 57, other program modules 59 and program data 61.

The computer 41 may also include other removable/non-removable, volatile/nonvolatile computer storage media. By way of example only, FIG. 3A illustrates a hard disk drive 65 that reads from or writes to non-removable, nonvolatile magnetic media, a magnetic disk drive 77 that reads from or writes to a removable, nonvolatile magnetic disk 79, and an optical disk drive 81 that reads from or writes to a removable, nonvolatile optical disk 83 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 65 is typically connected to the system bus 45 through a non-removable memory interface such as interface 63, and magnetic disk drive 77 and optical disk drive 81 are typically connected to the system bus 45 by a removable memory interface, such as interface 75.

The drives and their associated computer storage media, discussed above and illustrated in FIG. 3A, provide storage of computer readable instructions, data structures, program modules and other data for the computer 41. In FIG. 3A, for example, hard disk drive 65 is illustrated as storing operating system 67, application programs 69, other program modules 71 and program data 73. Note that these components can either be the same as or different from operating system 55, application programs 57, other program modules 59, and program data 61. Operating system 67, application programs 69, other program modules 71, and program data 73 are given different numbers hereto illustrate that, at a minimum, they are different copies. A user may enter commands and information into the computer 41 through input devices such as a tablet, or electronic digitizer 93, a microphone 91, a keyboard 89 and pointing device 87, commonly referred to as a mouse, trackball or touch pad. Other input devices (not shown) may include a joystick, game pad, satellite dish, scanner, or the like. These and other input devices are often connected to the processing unit 43 through a user input interface 85 that is coupled to the system bus, but may be connected by other interface and bus structures, such as a parallel port, game port or a universal serial bus (USB). A monitor 111 or other type of display device is also connected to the system bus 45 via an interface, such as a video interface 109. The monitor 111 may also be integrated with a touch-screen panel or the like. Note that the monitor and/or touch screen panel can be physically coupled to a housing in which the computing device 41 is incorporated, such as in a tablet-type personal computer. In addition, computers such as the computing device 41 may also include other peripheral output devices such as speakers 117 and printer 115, which may be connected through an output peripheral interface 113 or the like.

The computer 41 may operate in a networked environment using logical connections to one or more remote computers, such as a remote computer 103. The remote computer 103 may be a personal computer, a server, a router, a network PC, a peer device or other common network node, and typically includes many or all of the elements described above relative to the computer 41, although only a memory storage device 105 has been illustrated in FIG. 3A. The logical connections depicted in FIG. 3A include a local area network (LAN) 97 and a wide area network (WAN) 101, but may also include other networks. Such networking environments are commonplace in offices, enterprise-wide computer networks, intranets and the Internet. For example, in the present invention, the computer system 41 may comprise the source machine from which data is being migrated, and the remote computer 103 may comprise the destination machine. Note however that source and destination machines need not be connected by a network or any other means, but instead, data may be migrated via any media capable of being written by the source platform and read by the destination platform or platforms.

When used in a LAN networking environment, the computer 41 is connected to the WAN 101 through a network interface or adapter 95. When used in a WAN networking environment, the computer 41 typically includes a modem 99 or other means for establishing communications over the WAN 101, such as the Internet. The modem 99, which may be internal or external, may be connected to the system bus 45 via the user input interface 85 or other appropriate mechanism. In a networked environment, program modules depicted relative to the computer 41, or portions thereof, may be stored in the remote memory storage device. By way of example, and not limitation, FIG. 3A illustrates remote application programs 107 as residing on memory device 105. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that several of the acts and operation described hereinafter may also be implemented in hardware.

In network optimization system 40, router 42 collects flow-based statistics on network traffic, such as protocols used, ports used, and other information. Application statistics functions may be dedicated services that gather application-level information and statistics through protocols, such as SNMP that may, for example, follow the RMON2 standard. In addition, network optimization system 40 uses network devices 46 to acquire statistics that may be gathered through SNMP. Response time data may be collected from individual program databases, such as an end-to-end database. Network specific databases 50 may receive the information from these network resources and generate a highly scalable network-specific database that uses data-mining techniques and data pre-processing functions to process a large set of statistical information. At workstation 52, computer network 12 analysis and reporting functions occur. In essence, workstation 52 provides dynamic incident tracking and investigation supporting various performance management functions 22. From workstation 52, the disclosed subject matter provides report visualization functions 54 as an output of the present method and system for visualizing network performance characteristics.

One aspect of network optimization system 40 includes application response time functions that quickly track and measure end-user response time. The application response time functions operate without desktop or server agents and separate response time into application, network, and server delay components. The application response time functions, therefore, enable rapid troubleshooting of application performance bottlenecks. Network optimization system 40 also includes automated processes to measure and analyze application response time for all user transactions. Report visualization functions 54 permit comparing response times and other computer network 12 performance indictors against intelligent baselines. Moreover, network optimization system 40 may automatically investigate the cause of problems as they occur.

Network optimization system 40 also provides report analyzer functions that operate on workstation 52 and in conjunction with report visualization functions 54. The result is a flexible analysis engine that enables network managers to understand how application traffic impacts computer network 12 performance. Using report visualization functions 54 and the associated analysis tools of workstation 52, the present embodiment allows identifying which applications are using excessive bandwidth, the location of such users, and when such applications are being used. Report analyzer functions of workstation 52 cooperate with network specific databases 50 to store and report enterprise-wide router 42 data and application statistics 44, for extended periods of time (e.g., an entire year). Such storage in network specific databases 50 allows network managers to make important cost reduction, troubleshooting, capacity planning, and traffic analysis decisions.

Network optimization system 40 separates application response times into network, server, and application delays, and generates alarms based on customer defined thresholds. However, network optimization system 40 does not require the deployment of agents on workstations within computer network 12. Network optimization system 40 collects large amounts of data from multiple sources and presents them as meaningful information and can aggregate data for reporting and analysis. Network optimization system 40 provides custom exception reporting and may drill down from the enterprise level to individual hosts and conversations occurring on computer network 12.

In addition, network optimization system 40 enables a variety of computer network 12 advisory services to occur. That is, network optimization system 40 permits analyzing application response times without deploying client-side agents. Using the disclosed subject matter, network optimization system 40 permits the analysis of huge volumes of data from multiple sources for rapid identification by application of network traffic and congestion sources. As such, network optimization system 40 enables advisory service for making recommendations that translate into lower network costs and improved response, thus making advantageous use of the visualizations herein described.

FIG. 4 shows application response time data plot 50 for one embodiment of the disclosed subject matter. The data of FIG. 4 may be derived from a single server or a cluster of servers. Response time data plot 60 plots time in seconds along axis 62 against calendar date and time, along axis 64. Threshold bar 66 sets a limit (e.g., 1 second) for response time plot 68. When response time plot 68 exceeds threshold bar 66, network optimization system 40 presents through report visualization functions 54 a violation report. Values reported for response time plot 68, in one embodiment, results from the accumulation of separate plots of the constituent components of the traffic response time delays. This may include network round trip time (RTT) delays, retransmission delays, data transfer delays, server response delays and connect time delays. In particular as response time plot 68 shows, server response delays 70 are the major contributor to the total response time plot 68. Thus, as traffic occurs on a computer network, as indicated by traffic plot 72, delays, as peaks in response time plot 68 show, result in traffic reductions, as valleys in traffic plot 72 exhibit.

Violations of various service agreements, for example, may relate to the degree by which response time plot 68 exceeds threshold bar 66 time limit, e.g., one second. For example, peak 74 may be viewed as a major violation, since the response time exceeds threshold bar by approximately two seconds. Peak 76, which exceeds threshold bar by slightly more than one second, may be viewed as an intermediate violation. Finally, peak 78 may be considered a minor violation, since the one-second threshold bar 66 is exceeded by less than 0.25 seconds.

Response time data plot 50 shows a specific server. The present embodiment may also provide information for a single interface. However, other embodiments may also provide for multiple servers, i.e., at a next level of granularity. Thus, using one diagram, it is possible to determine the aggregate violations of a set of servers. This potentially provides such additional valuable information that may be useful for managing the operation of a network.

FIG. 5 provides violation intensity chart 80 that may be generated using the disclosed subject matter. In violation intensity chart 80, "Hours in Day" axis 82 crosses "Days" axis 84 to permit recording the specific time and day on which a violation occurs. Violation intensity chart 80 relates response time plot 68 to threshold bar 66 by providing a visualization of the degree by which response time plot 68 exceeds threshold bar 66. Thus, as exploded regions 86 and 88 show, violation intensity chart 80 presents tick marks of varying colors or other differentiating characteristics to demonstrate the degree by which response time plot exceeds threshold bar 66. In the illustrated example, a red tick mark 90 (which may appear alternatively as vertical hash marks) may relate to major violation peak 74 (FIG. 4), an orange tick mark 92 (which may appear alternatively as diagonal hash marks) relate to intermediate violation peak 76, and a yellow tick mark 94 (which may appear alternatively as horizontal hash marks) may relate to minor violation peak 78.

Particularly attractive features of violation intensity charts include workday regions 96 and weekend regions 98. Workday regions 96 brackets the hours during which a company generally works. Weekend regions 98 highlights the weekend days. Identifying these time and day regions, violation intensity chart 80 allows a network manager to focus attention on specific violation periods. Thus, for example, in the event that an excessive number of red tick marks 90 arise in work hour regions 96 and outside of weekend regions 98 time response violation may be a major concern for computer network 12 which requires immediate attention. On the other hand, if red tick marks 90 only occur during weekend regions 98 and outside work hour regions 96, then immediate action may not be appropriate.

The shadings in color intensity provide the ability to determine utilization, as well as violations. The shadings in color intensity also provide the ability to determine the degree of the utilization and/or violation of a particular network.

In addition to violation intensity chart 80, the disclosed subject matter provides meaningful visualizations of associated and interdependent network quality of service indicators. FIG. 6, therefore, illustrates the generation of a server print plot 100, which integrates network performance measurements from network optimization system 40. In the example of FIG. 6, server print plot 100 (so named by virtue of providing a signature or distinct finger print of computer network 12 operations) may provide measurement visualizations from six computer network 12 quality of service indicators. Response time plot 102, as already described, may plot composite response times versus date-time slots. Refused sessions plot 104 plots refused TCP/IP sessions for particular date-time slots against total sessions. Total sessions plot 106 plots total numbers of users against day-time slots. Also, traffic volume plot 108 provides both "to server" and "from server" volume statistics for computer network 12.

FIG. 6 integrates statistics from plots 102 through 108 to facilitate visualizing computer network 12 operations. In FIG. 6, server print plot axes include SRT axis 110, percent (%) refused sessions axis 112, volume (to) axis 114, volume (from) axis 116, total sessions axis 118, and burstiness axis 120. Nominal performance polygon 122 relates to nominal or average performance of computer network 12 over a predetermined or defined period of time. Nominal performance polygon 122 may be formed as a regular polygon by normalizing the respective average quality of service indicator (e.g., SRT) along SRT axis 110 and with relation to the other quality of service indicators, which, likewise may be normalized to their respective axes. Dynamic performance polygon 124, which may or may not be a regular polygon, provides measured quality of service indicator statistics relative to the normalized and averaged quality of service indicators of nominal performance polygon 122.

Server print plot 100 displays key indicators for a network problem solution into one diagram. With prior approaches there may be the need to have use up to three browsers and many different plots at a single time to see all of the information appearing in server print plot 100. FIG. 6 also demonstrates what normal or nominal behavior occurs on a particular network. In reviewing an entire time period (e.g., month), FIG. 6 shows the different metrics normalized to a single plot. By determining a relative range for each metric, then FIG. 6 measures dynamic performance according to the various metrics. Based on this, FIG. 6 provides a precise measurement on the plot of the dynamic information relative to the nominal value of the associated indicator. Thus, all indicators reported on FIG. 6 are measured dynamically and quantitatively against the nominal values over the specified time period.

FIGS. 7 and 8 show dynamic performance polygons and nominal performance polygons deriving from operation of the disclosed subject matter. In particular, FIG. 7 depicts on network print plot 130 nominal performance polygon 132 and dynamic performance polygon 134. Network print plot 130 includes for visualization network RTT axis 136, percent (%) byte loss axis 138, volume (to) axis 140, volume (from) axis 142, total sessions axis 144, retransmission axis 146, and users axis 148. Nominal performance polygon 132 takes the form of a regular seven-sided polygon. As FIG. 7 depicts, nominal performance polygon 132 represents nominal behavior of a computer network 12 during a period, such as Aug. 1, 2003 through Sep. 1, 2003. Clearly, different period quality of service indicators may be represented for network print plot 130 according to a network manager's preferences and needs.

Dynamic performance polygon 134 of FIG. 7, in contrast to nominal performance polygon 132, presents a non-regular shape. The example of dynamic performance polygon, in particular, dynamic performance polygon 134 exceeds nominal values of nominal performance polygon 132 along network RTT axis 136, volume (to) axis 140, volume (from) axis 142, total sessions axis 144, and users axis 146. On the other hand, dynamic performance polygon 134 presents quality of service indicator values below nominal performance polygon 132 along percent (%) byte loss axis 138 and retransmission axis 146.

The example of FIG. 7 may be interpreted as a heavily used network. Actually, however, the measured indicators do not show faulty or defective operation of the network. The network, while handling more than usual traffic, may need to have its computer network 12 capacity increased, if the dynamic quality of service indicators continue over a period of time to indicate the statistics of FIG. 7.

In FIG. 8, server print plot 150 provides the ability to compare dynamic performance polygon 152 to nominal performance polygon 154. Dynamic performance polygon, in this example, presents real-time normalized statistics for the time 11:50 on Jun. 12, 2003. In contrast, nominal performance polygon 154 displays normalized nominal behavior for the period of Jun. 1, 2003 through Jul. 1, 2003. Quality of service indicators for server print plot 150 include those displayed by SRT axis 156, percent (%) refused sessions axis 158, volume (to) axis 160, volume (from) axis 162, total sessions axis 164, and burstiness axis 166. Dynamic performance polygon 152 reports nominal percent (%) refused sessions and nearly nominal burstiness statistics. However, IRST, volume (to), volume (from), and total sessions statistics all appear to exceed nominal values.

FIG. 8 specifically references measurements against data gathered over time and averaged. The present embodiment plots dynamic measurements against the averaged information. Dynamic performance polygon 152 demonstrates that many more than the average number of sessions are occurring. If this were not so high, it might be interpreted that the network flows more traffic volume, conducting more sessions, and the server response was simply working hard. Because a great deal of volume flows into the server, a problem may exist in computer network 12. For example, a server may be mis-configured. On the other hand, such server may be in a multi-tiered environment. So, what dynamic performance polygon 152 shows may not be an extreme problem. However, the plot alerts the engineer to a potential problem, and focuses the investigation to some form of mis-configuration, such as when data being unexpectedly pushed to the server, or to the fact the server is involved in a multi-tiered application (which is also sometimes not known to the network engineer).

FIG. 9 depicts on network print plot 170 time varying dynamic performance polygons for reporting variations in computer network performance. In particular, network print plot 170 displays nominal performance polygon 172 relating to the performance measurement period between 1:00 a.m. February 27 and 1:00 a.m. Feb. 28, 2003. For comparison purposes, network print plot 170 presents five dynamic performance polygons, all taken on Feb. 27, 2003, and at five minute intervals. Specifically, dynamic performance polygon 174 relates to time 1:38 a.m.; dynamic performance polygon 176 relates to time 1:43 a.m.; dynamic performance polygon 178 relates to time 1:48 a.m.; dynamic performance polygon 180 relates to time 1:53 a.m.; and dynamic performance polygon 182 relates to time 1:58 a.m.

Network print plot 170 portrays computer network 12 quality of service indicators along network round trip time (NRTT) axis 184, percent (%) byte loss axis 186, volume (to) axis 188, volume (from) axis 190, total sessions axis 192, retransmission axis 194, and users axis 196.

FIG. 9, therefore, details in a more comprehensive fashion the information heretofore described. Dynamic performance polygon 182 will result in a violation determination by network optimization system 40. By the time a violation is determined, however, dynamic performance polygon 182 demonstrates a high network roundtrip measurement, together with high volume (from). These indications may not truly be a problem. However, because the measurements are significantly above normal, an investigation should occur. With this information, there is the need to determine the cause for at least two of the indicators being out of range. The analyses should, therefore, be of what the causes are and what the side effects are of the out of range conditions.

Dynamic performance polygons 174 through 180 provide information in reverse order from the violation. This allows a view of dynamic performance polygon 180, which occurs only five minutes before dynamic performance polygon 182. Dynamic performance polygon 180 shows a large percentage byte loss. Another out of specification indicator is the retransmission indicator. There was also more volume to the server. Going back one more frame to dynamic performance polygon 178, it is possible to see that the only indicator that is out of specification is the number of users.

By continuing to back up the measurements, it is possible to isolate the first out of range indicator. This may assist in determining the root cause of the network malfunctions or mis-configurations. In dynamic performance polygon 174, the total sessions and users indicators are high. Thus, what caused the network to malfunction was the presence of too many sessions and users. This situation, however, is not at all apparent from the measurement, i.e., dynamic performance polygon 182 that resulted in the service agreement violation. That is, the violation was an effect, and certainly not a cause of the network malfunction. This demonstrates the dynamic, interrelated nature of computer network 12 and how a network degradation may affect different quality of service indicators.

Thus, using the combination of dynamic performance polygons and nominal performance polygons in server and network print plots, there is the potential for indicating correlations and causalities.

The disclosed subject matter may provide the ability to determine a network violation at some period before it occurs. In such case, there may be the ability to respond to an indicator change and, thereby, take preemptive action that could reduce or eliminate serious network effects. Such preemptive action may include avoiding over-use of network resources or timing of excessive network loading to occur at more optimal times.

In yet a further embodiment of the disclosed subject matter, there is the ability to associate a plurality of server or network print plots. It may be possible to categorically identify the different violations that occur by viewing a broad array of server or network print plots. Upon categorically identifying such violations, based on the server or network print plots, the disclosed server or network print plots may provide insights into how to categorically eliminate network violations or out of range conditions. By categorically eliminating problems, based on the characteristic server or network print plots that such problems generate, the disclosed subject matter may very significantly improve overall network operations.

Moreover, by creating and diagnosing categories of server or network print plots, the present embodiment may suggest correlations between different categories of network conditions that generate characteristic server print plots. By responding to server or network print plot data, even prior to an out of range condition arising, the disclosed subject matter may even more significantly improve overall network performance.

On an even larger scale, by associating categories of server or network print plots from various points of a network system, the disclosed subject matter may provide real-time data for assisting in the diagnosis of network problems at many different levels. Thus, in addition to providing comparisons of real time visualizations of computer network 12 performance, the disclosed subject matter allows for the aggregation of statistics over longer periods of time. Such aggregations enable trend analyses for both longer term and larger scale performance management functions. For example, FIGS. 10 and 11 display overall network exception status information for a particular computer network 12. Although the information presented by FIGS. 10 and 11 is the same in the example, the two plots appear in different forms.

FIG. 10, for example, reports in overall network exception status bar chart 200 exception status for the months of 9-2004 (September) in bar 202, 10-2004 (October) in bar 204, 11-2004 (November) in bar 206, and 12-2004 (December) in bar 208, all across axis 210. The "hours in violation" axis 204 varies, in this example, from 0 to 5000 hours for presenting the cumulative hours that computer network 12 violates the applicable service agreement. Violations may vary from unwanted peer-to-peer traffic, as bar 202 portion 210 relates to the more common violations appearing in all bars 202 through 208. That is, violations may include NetBIOS over 25 percent (%) violation 212, overall utilization over 80 percent (%) violation 214, unexpectedly high management traffic violation 216, and unwanted real-time streaming protocol (RSTP) traffic violation 218. FIG. 10, therefore, provides a clear visualization of the cumulative exception status for computer network 12.

In contrast, FIG. 11 shows overall network exception status point chart 220 for visualizing the exception status of computer network 12 during the same reporting period of FIG. 10. Overall network exception status point chart 220 uses "hours in violation axis" 222, which ranges from 0 to 2600 hours for displaying exception status variations in computer network 12 on a per violation basis. Thus, for overall computer network 12 exceptions occurring during the period 9-2004 through 12-2004, plot 224 reports variations in the NetBIOS over 25 percent (%) violation, plot 226 reports variations in overall utilization being over 80 percent (%), plot 228 reports the unexpectedly high management traffic violation, plot 230 reports the unwanted peer-to-peer traffic violation, and plot 232 reports unwanted RTSP violations.

While FIGS. 10 and 11 relate to overall network statistics, FIG. 12 presents violation trend bar chart 240 that further demonstrates the ability of the disclosed subject matter to aid in performance management of computer network 12. FIG. 12 presents in violation trend bar chart 240, a specific violation, i.e., unwanted RSTP traffic, is reported on a per site 14 basis. Chart 240 of FIG. 12 may, for example, be generated in response to a "drill in" of plot 232 in FIG. 11. Moreover, individual site 14 violation data is reported over specific time periods. Thus, for the New York Gateway Interface, for example, bar 242 reports the hours in violation for October 2004 for unwanted RTSP traffic, here approximately 550 hours. Bars 244 and 246 report the same type of data for the months of November (approx. 510 hours) and December 2004 (approx. 540 hours), respectively. In the example of FIG. 12, computer network 12 includes forty-two sites 14. However, violation trend bar chart 240, for the sake of simplicity and clarity, only displays the six sites demonstrating the more significant violations, based on a dynamic algorithm. In the example, these include the Taiwan interface site in bars 248, the Fairbanks interface site in bars 250, the Saigon interface site in bars 252, the Santa Fe interface site in bars 254, and the Milan interface site in bars 256.

In summary, therefore, the disclosed subject matter provides a method and system for visualizing and monitoring quality of service of a computing network. The method includes the steps and the system includes the structures for monitoring application network transactions and behaviors for the computing network. The computing network includes one or more client subnets accessing one or more servers. The monitoring may be independent of client site monitors. The method and system gather statistical data relating to at least one network, a server and associated applications and generate a plurality of measurements of at least one quality of service indicator. The quality of service indictors associate with the performance of the computer network. The method and system further display the plurality of measurements of the at least one quality of service indicator according to the date and time of gathering the statistical data and displaying graphically the degree by which each of said plurality of measurements of the quality of service indicator varies from a predetermined threshold quality of service level for the computing network.

In further summary, the disclosed subject matter provides a method and system for visualizing and monitoring the performance of a computer network that include the steps and structures for displaying graphically a plurality of averaged network quality of service indicators. The averaged network quality of service indicators relate to a radial plot and visually interlinked to form a nominal performance polygon. The nominal performance polygon includes a plurality of corners. Each of said corners corresponds to a separate one of the plurality averaged quality of service indicators. The method and system furthermore dynamically measure a plurality of network quality of service indicators. Each of the plurality of network quality of service indicators corresponds to one of the plurality of averaged network quality of service indicators. The method and system display graphically the dynamically measured plurality of network quality of service indicators as a radial plot point on the radial plot and visually interlink the radial plot points for forming a dynamic performance polygon. The dynamic performance polygon relates to the dynamic performance of the computer network. The disclosed subject matter allows monitoring the dynamic performance of the computer network by dynamically comparing variations in said dynamic performance polygon with said nominal performance polygon.

The foregoing description of the preferred embodiments, therefore, is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

What is claimed is:

1. A method for visualizing and monitoring network performance of a computer network, comprising the steps of:
    displaying graphically a visually interlinked view of at least four normalized nominal network quality of service (Qos) indicators, said normalized nominal network QoS indicators associated on a radial plot and visually interlinked to form a nominal performance polygon, said nominal performance polygon comprising a plurality of corners, each of said corners corresponding to a separate one of said plurality of normalized nominal QoS indicators, each of said normalized nominal network QoS indicators being substitutable with other normalized nominal network performance indicators;
    measuring real-time performance variations for each of said normalized nominal network QoS indicators;
    displaying graphically said real-time performance variations as real-time normalized points on said radial plot;
    visually interlinking said real-time normalized points for forming a time-varying performance polygon, said time-varying performance polygon relating to real-time network performance variations of said computer network; and
    continually monitoring network performance of the computer network by comparing variations of said time-varying performance polygon with said nominal performance polygon.

2. The method of claim 1, further comprising the step of graphically displaying said plurality of measurements of said at least one of said QoS indicators from the group consisting essentially of network round trip time, percent (%) byte loss, volume (to) traffic, volume (from) traffic, number of total sessions, number of retransmission, and number of users.

3. The method of claim 1, further comprising the step of determining a plurality of network QoS problems as a result of monitoring the real-time network performance variations of the computer network using said time-varying performance polygon and said nominal performance polygon.

4. A system for visualizing and monitoring quality of service of a computing network, the system comprising:
    display circuitry for displaying graphically a visually interlinked view of at least four normalized nominal network QoS indicators, said normalized nominal network QoS indicators associated on a radial plot and visually interlinked to form a nominal performance polygon, said nominal performance polygon comprising a plurality of corners, each of said corners corresponding to a separate one of said plurality of normalized nominal QoS indicators;
    measurement circuitry for measuring real-time performance variations for each of said normalized nominal network QoS indicators;
    said display circuitry further for displaying graphically said real-time performance variations as real-time normalized points on said radial plot;
    interlinking instructions associated with said display circuitry for visually interlinking said real-time normalized points for forming a time-varying performance polygon, said time-varying performance polygon relating to real-time network performance variations of said computer network; and
    monitoring circuitry for continually monitoring network performance of the computer network by comparing variations of said time-varying performance polygon with said nominal performance polygon.

5. The system of claim 4, further comprising instructions for forming said nominal performance polygon for a time period equaling approximately one month.

6. The system of claim 4, wherein said time-varying performance polygon is formed for a time period equaling approximately one day.

7. The system of claim 5, wherein said nominal performance polygon is formed for a time period equaling approximately one month.

8. A network quality of service display system for visualizing and monitoring the quality of service for a computer network, comprising:
    means for displaying graphically a visually interlinked view of at least four normalized nominal network (Qos) indicators, said normalized nominal network QoS indicators associated on a radial plot and visually interlinked to form a nominal performance polygon, said nominal performance polygon comprising a plurality of corners, each of said corners corresponding to a separate one of said plurality of normalized nominal QoS indicators, each of said normalized nominal network QoS indicators being substitutable with other normalized nominal network performance indicators;

means for measuring real-time performance variations for each of said normalized nominal a plurality of network QoS indicators;

means for displaying graphically said real-time performance variations as real-time normalized points on said radial plot;

means for visually interlinking said real-time normalized points for forming a time-varying performance polygon, said time-varying performance polygon relating to time network performance variations of said computer network; and means for continually monitoring network performance of the computer network by comparing variations of said time-varying performance polygon with said nominal performance polygon.

9. The system of claim 8, wherein a plurality of said time-varying performance polygons are displayed in time sequence for displaying progressive network performance over a predetermined time period.

10. The system of claim 8, wherein time-varying network performance characteristics are classified according to associated classifications of groupings of a plurality of said time-varying performance polygons.

11. A computer program product, comprising a computer usable medium having computer readable program code means embodied therein for operation in association with a computer network for visualizing and monitoring the quality of service of the computer network, the computer usable medium comprising:

computer readable program code means for displaying graphically a visually interlinked view of at least four normalized nominal network (Qos) indicators, said normalized nominal network QoS indicators associated on a radial plot and visually interlinked to form a nominal performance polygon, said nominal performance polygon comprising a plurality of corners, each of said corners corresponding to a separate one of said plurality of normalized nominal QoS indicators, each of said normalized nominal network QoS indicators being substitutable with other normalized nominal network performance indicators;

computer readable program code means for measuring real-time performance variations for each of said normalized nominal network QoS indicators;

computer readable program code means for displaying graphically said real-time performance variations as real-time normalized points on said radial plot;

computer readable program code means for visually interlinking said real-time normalized points for forming a time-varying performance polygon, said time-varying performance polygon relating to real-time network performance variations of said computer network; and computer readable program code means for continually monitoring network performance of the computer network by comparing variations of said time-varying performance polygon with said nominal performance polygon.

12. The method of claim 1, wherein said nominal network QoS indicators are normalized using the average of said nominal network QoS indicators over a determined time frame of measurement.

13. The method of claim 1, further comprising the step of interchanging said at least one of said QoS indicators for populating said radial plot in accordance with a determined analysis associated with visualizing and monitoring network performance.

14. The method of claim 1, further comprising the method for visualizing and monitoring network performance of a computer network by displaying on a violation intensity chart selected aggregate violations of a plurality of service agreements associated with network performance, said violation intensity chart providing a visualization of the degree by which network QoS indicators exceed predetermined thresholds.

15. The method of claim 14, wherein said violation intensity chart displays various color intensities representative of the level by which said thresholds are exceeded.

16. The method of claim 14, wherein said violation intensity chart displays as a Cartesian chart with an x-axis and y-axis, said x-axis displaying the hours in a day, said y-axis displaying the days in a month.

* * * * *